Patented Feb. 14, 1950

2,497,304

UNITED STATES PATENT OFFICE 2,497,304

PREPARATION OF CARBOXYLIC ACID ANHYDRIDES

William F. Gresham and Richard E. Brooks, Wilmington, Del., assignors to E. I. du Pont de Nemours & Company, Wilmington, Del., a corporation of Delaware No Drawing. Application November 23, 1945, Serial No. 630,540

10 Claims. (Cl. 260—546)

This invention relates to the synthesis of organic compounds and particularly to the preparation of organic carboxylic acid anhydrides by the interaction of olefinic substances, carbon monoxide, and carboxylic acids.

Various processes have been proposed heretofore for the preparation of organic carboxylic acid anhydrides. For example, acetic anhydride has been prepared by pyrolysis of ethylidene diacetate, or by the direct high temperature dehydration of acetic acid. Other anhydrides have been prepared by reaction between acetic anhydride and the corresponding organic carboxylic acid.

An object of the present invention is to provide a novel process for the synthesis of organic carboxylic acid anhydrides from relatively inexpensive starting materials. A further object of the invention is to provide a commercially feasible process for the synthesis of organic carboxylic acid anhydrides employing olefins and carbon monoxide as starting materials. Other objects and advantages of the invention will appear hereinafter.

It has been discovered, in accordance with the invention, that organic carboxylic acid anhydrides, and, in particular embodiments, carboxylic acid anhydrides of aliphatic acids can be prepared by reaction between unsaturated compounds containing the non-aromatic olefinic grouping $>C=C<$, carbon monoxide and carboxylic acids. The unsaturated compounds which may be employed in the practice of the invention include the olefinic hydrocarbons, such as, for example, ethylene, propylene, the butylenes, etc. These hydrocarbons may be represented by the formula:

$$RR_1C=CR_2R_3$$

in which $R$, $R_1$, $R_2$ and $R_3$ represent hydrogen or an alkyl, aryl, or aralkyl radical. The reaction also takes place with compounds containing aromatic unsaturation, such as naphthalene.

The following equation illustrates a reaction which takes place when a carboxylic acid anhydride is produced from an olefine, carbon monoxide, and a carboxylic acid of the formula, $R_4COOH$, $R_4$ representing alkyl, aryl, or aralkyl groups:

$$RR_1C=CR_2R_3+CO+R_4COOH=CHRR_1CR_2R_3COOCOR_4$$

The isomeric anhydride, $CHR_2R_3CRR_1COOCOR_4$ also would be produced. In a specific embodiment, ethylene reacts with carbon monoxide and propionic acid to form propionic anhydride in substantially the following manner:

$$C_2H_4+CO+C_2H_5COOH=CH_3CH_2COOCOC_2H_5$$

propylene and butylene similarly react with propionic acid to form the corresponding mixed anhydrides, respectively. By utilizing other aliphatic carboxylic acids than propionic acid, numerous organic carboxylic acid anhydrides can be prepared, such, for example, as the following: carbon monoxide reacting with formic acid and ethylene to give formic propionic anhydride; carbon monoxide reacting with acetic acid and ethylene to give a mixed acetic propionic anhydride; carbon monoxide reacting with propylene and butyric acid to give butyric anhydride; carbon monoxide reacting with isobutylene and isovaleric acid to give isovaleric anhydride, etc. Other carboxylic acids such as adipic, benzoic, oleic, etc., may be employed in a similar manner.

Raw materials suitable for use in the process are readily available from a number of sources. Thus, ethylene and various homologs thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity. However, hydrocarbon mixtures, containing saturated hydrocarbons as well as olefines, such as may be obtained by cracking and/or dehydrogenation, may be used if desired. Diolefines, cyclo-olefines, and substituted olefines are also generally applicable in the practice of the invention.

It is, in general, desirable that neither the carboxylic acid, nor the olefinic reactant contain substituent groups (such as alcoholic hydroxyls) which react secondarily with the anhydride produced, for this results in a loss of anhydride. Other substituent groups may, of course, be present without causing such a loss in yield. The highest yields are generally obtained under anhydrous conditions.

The carbon monoxide required for the synthesis may be conveniently derived from various commercial sources, such as, for example, water gas, producer gas, etc., by liquefaction, or by other methods, and should, likewise, for the best results, be relatively pure.

Inert gases, such as nitrogen, methane, etc., may be included with the reactants, this being advantageous in some cases from the standpoint of controlling the temperature of the exothermic reaction and limiting the extent thereof, for it may be desired to restrict the overall conversion of the reaction for the sake of enhancing the relative yield of the desired carboxylic acid anhydrides.

The relative proportions of the reactants can be varied.

The use of pressure in excess of atmospheric, say from 25 to 2000 atmospheres, is preferred, although somewhat higher pressures may, if desired, be used. It is preferred to operate at pressures of about 300 to 1500 atmospheres, in order to obtain a suitable reaction rate.

Generally, the desired reaction can be obtained at temperatures of about 200° to 500° C. From the standpoint of practical operation, the temperature should not be so low that the reaction rate is not economical, nor so high as to result in undesirable by-products by decomposition and/or polymerization of the raw material. From this point of view, the process has been found to operate very satisfactorily at 275° to 400° C.

The invention is preferably practiced by heating the reactants in the presence of a suitable catalyst under the aforesaid conditions of temperature and pressure. Numerous materials have been found to be effective as catalysts, particularly various salts, oxides, hydroxides, metals and metal carbonyls. However, outstanding results are obtained with catalysts containing nickel carbonyl, or substances which give rise to nickel carbonyl under the conditions of the reaction. Excellent results have been obtained, for example, in the synthesis of propionic anhydride by heating propionic acid with ethylene and carbon monoxide in the presence of nickel propionate. Propionic anhydride has been obtained in somewhat lower yields by heating ethylene with carbon monoxide and propionic acid in the presence of such catalysts as copper, cobalt, or manganese compounds, or mixtures thereof. Inert supports for these catalysts may be used if desired.

When nickel carbonyl is used as the catalyst in the practice of the invention, it may be recovered by distillation under a blanket of carbon monoxide. The recovered catalyst, may, of course, be reused.

The following examples will illustrate methods of practicing the invention, although the invention is not limited thereto:

*Example 1.*—A mixture containing 74 grams of propionic acid, 10 grams of nickel carbonyl and 28 grams of ethylene was heated in a copper-lined pressure resistant vessel with carbon monoxide at a temperature of 272° to 293° C., under a pressure of 600 to 810 atmospheres for 15 minutes. Distillation of the resulting product showed 39% conversion to propionic anhydride, and 93% yield, based on the weight of propionic acid initially present.

*Example 2.*—A mixture containing 74 grams of propionic acid, 5 grams of cobalt propionate and 28 grams of ethylene was processed with CO at a temperature of 261° to 280° C. under a pressure of 525 to 845 atmospheres. The liquid product contained 7 grams of propionic anhydride (5.3% conversion).

*Example 3.*—A mixture of 60 grams of acetic acid, 28 grams of ethylene and 20 grams of nickel carbonyl was processed with carbon monoxide at 445 to 805 atmospheres pressure at 250° to 275° C. Liquid product was distilled and found to contain a quantity representing 43.8% conversion and essentially quantitative yield of the mixed anhydride of propionic and acetic acid.

*Example 4.*—A mixture of 74 grams of propionic acid, 28 grams ethylene, and 10 grams nickel formate was processed with carbon monoxide at a temperature of 285° to 303° C. under a pressure of 500 to 850 atmospheres for 1 hour. The liquid product was distilled and found to contain propionic anhydride representing 20% conversion based on propionic acid charged.

*Example 5.*—A mixture containing 32 grams of naphthalene, 20 grams of nickel carbonyl, 74 grams of propionic acid processed with carbon monoxide at a temperature of 290° to 300° C. under a pressure of 750 to 800 atmospheres for 30 minutes. The resulting product containing considerable unreacted naphthalene was dissolved in ether and the ether solution extracted with dilute sodium hydroxide solution. Acidification of this alkaline solution caused precipitation of a small amount of an acid M. P. 177–178°, neutral equivalent 179. This acid is regarded as having the following structure (neutral equivalent, 174):

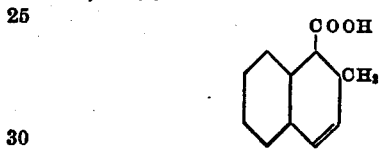

The isolation of this acid indicated that the reaction mixture had contained the mixed anhydride of this acid with propionic acid.

*Example 6.*—A mixture containing 74 grams of propionic acid, 10 grams of nickel propionate and 28 grams of ethylene was heated for 15 minutes at a temperature of 275° to 295° C., under a carbon monoxide pressure of 590 to 810 atmospheres. Distillation of the resulting product gave 52 grams, B. P. 124° to 142° C.; 11 grams, B. P. 142° to 160° C.; and, 23 grams, B. P. 160° to 167° C. Analysis of the second and third fractions showed the presence of propionic anhydride, corresponding to 22.5% conversion and 97% yield, based on the amount of propionic acid initially employed.

*Example 7.*—A mixture containing 74 grams of propionic acid, 28 grams of ethylene and 5 grams of nickel carbonyl was heated at a temperature of 275° to 290° C. for 20 minutes in a copper-lined shaker tube, under a carbon monoxide pressure of 700 to 820 atmospheres. Distillation of the resulting product gave a propionic anhydride fraction which corresponded to 28.4% conversion, and 92.5% yield, based on the amount of propionic acid employed.

*Example 8.*—Example 1 was repeated using propylene as the olefinic hydrocarbon in place of ethylene. A comparatively low yield of mixed butyric, isobutyric and propionic anhydrides was obtained, in place of propionic anhydride.

In the copending applications S. N. 629,699 and S. N. 625,951, now Patents Nos. 2,448,368 and 2,448,375, respectively, it is disclosed that organic acids may be obtained by reaction between olefin hydrocarbons, carbon monoxide and water in the presence of a nickel carbonyl catalyst, under suitable conditions of temperature and pressure. In the practice of the present invention, it is possible to employ, as a starting material, the reaction product obtained in accordance with the aforesaid processes, provided the amount of water present in the said product is not sufficient to destroy the organic carboxylic acid anhydride produced in accordance with the present invention. Moreover, it is entirely possible to prepare anhydrides directly from H₂O, CO, and olefines, under the temperature and pressure conditions disclosed herein, but no anhydride would be recovered until all of the water was converted to acid.

The apparatus which may be employed in the practice of the present invention may be of any conventional type and, preferably, is one in which the temperature of exothermic reactions can be readily controlled at the desired value. The process of the invention may be conducted either batchwise or continuously. At elevated temperatures, and especially when a large excess of carbon monoxide is employed, the reaction evidently takes place in the vapor phase. Under such conditions, it is frequently desirable to have present in the reaction vessel a suitable absorptive material, such as silica gel or charcoal.

The apparatus employed in the practice of the invention may be made of or lined with any suitable inert material, such as glass, inert metals, copper, silver, silver-platinum alloys, and the like. In carrying out the process of the invention in a continuous manner tubular converters may be employed.

Various changes may be made in the method hereinbefore described without departing from this invention or sacrificing any of the advantages that may be derived therefrom.

It is to be understood that the expression "carboxylic acid" employed in the following claims refers to any organic compound having a —COOH group attached to carbon or hydrogen.

We claim:

1. A process for the synthesis of carboxylic acid anhydrides which comprises reacting under anhydrous conditions a carboxylic acid of the formula RCOOH, R being an alkyl group, with a hydrocarbon containing non-aromatic monoolefinic unsaturation, and carbon monoxide, at a temperature within the range of 200° to 500° C., under a pressure of 25 to 2000 atmospheres, in the presence of a nickel-containing catalyst of the class consisting of nickel carbonyl and substances which produce nickel carbonyl under the conditions of the reaction, whereby a reaction product containing organic carboxylic acid anhydride is produced and thereafter separating the said organic carboxylic acid anhydride from the resulting mixture.

2. The process of producing organic carboxylic acid anhydrides which comprises heating an olefinic hydrocarbon of the formula:

$$RR_1C=CR_2R_3$$

in which R, R₁, R₂ and R₃ each represents a member of the class consisting of hydrogen and alkyl radicals, said olefinic hydrocarbon having from two to four carbon atoms per molecule, with carbon monoxide and an aliphatic carboxylic acid of the formula R₄COOH, R₄ representing an alkyl radical, at a temperature of from 200° to 500° C. under superatmospheric pressure in the presence of a nickel carbonyl catalyst and thereafter separating organic carboxylic acid anhydride of the formula RR₁CHCR₂R₃COOCOR₄ from the resulting product.

3. The process of producing organic carboxylic acid anhydrides which comprises heating an olefinic hydrocarbon of the fomula:

$$RR_1C=CR_2R_3$$

in which R, R₁, R₂ and R₃ each represents a member of the class consisting of hydrogen and alkyl radicals, said olefinic hydrocarbon having from two to four carbon atoms per molecule, with carbon monoxide and an aliphatic carboxylic acid of the formula R₄COOH, R₄ representing an alkyl radical, at a temperature of from 275° to 400° C. under superatmospheric pressure in the presence of a nickel carbonyl catalyst, and thereafter separating organic carboxylic acid anhydride of the formula RR₁CHCR₂R₃COOCOR₄ from the resulting product.

4. The process of producing organic carboxylic acid anhydrides which comprises heating an olefinic hydrocarbon of the formula:

$$RR_1C=CR_2R_3$$

in which R, R₁, R₂ and R₃ each represents a member of the class consisting of hydrogen and alkyl radicals, said olefinic hydrocarbon having from two to four carbon atoms per molecule, with carbon monoxide and an aliphatic carboxylic acid of the formula R₄COOH, R₄ representing an alkyl radical, at a temperature of from 200° to 500° C., at a pressure of from 25 to 2000 atmospheres in the presence of a nickel carbonyl catalyst, and thereafter separating organic carboxylic acid anhydride of the formula RR₁CHCR₂R₃COOCOR₄ from the resulting product.

5. The process of producing organic carboxylic acid anhydrides which comprises heating an olefinic hydrocarbon of the formula:

$$RR_1C=CR_2R_3$$

in which R, R₁, R₂ and R₃ each represents a member of the class consisting of hydrogen and alkyl radicals, said olefinic hydrocarbon having from two to four carbon atoms per molecule, with carbon monoxide and an aliphatic carboxylic acid of the formula R₄COOH, R₄ representing an alkyl radical, at a temperature of from 200° to 500° C., at a pressure of from 300 to 1500 atmospheres in the presence of a nickel carbonyl catalyst and thereafter separating organic carboxylic acid anhydride of the formula RR₁CHCR₂R₃COOCOR₄ from the resulting product.

6. A process for the synthesis of propionic anhydride which comprises heating propionic acid with ethylene and carbon monoxide, at a temperature within the range of 200° to 500° C., under a pressure of 25 to 2000 atmospheres, in the presence of nickel carbonyl, whereby propionic anhydride is produced, and thereafter separating the said propionic anhydride from the resultant reaction product.

7. A process for the synthesis of propionic anhydride which comprises heating propionic acid with ethylene and carbon monoxide, at a temperature within the range of 200° to 500° C., under a pressure of 300 to 1500 atmospheres, in the presence of nickel carbonyl whereby propionic anhydride is produced and thereafter separating the said propionic anhydride from the resultant reaction product.

8. A process for the synthesis of propionic anhydride which comprises heating propionic acid with ethylene and carbon monoxide, at a temperature within the range of 275° to 400° C., under a pressure of 300 to 1500 atmospheres, in the presence of nickel carbonyl whereby propionic anhydride is produced and thereafter separating the said propionic anhydride from the resultant reaction product.

9. A process for the synthesis of propionic anhydride which comprises heating propionic acid with ethylene and carbon monoxide, at a temperature within the range of 200° to 500° C., under a pressure of 25 to 2000 atmospheres, in the presence of nickel propionate, whereby propionic anhydride is produced, and thereafter separating the said propionic anhydride from the resultant reaction product.

10. The process for the synthesis of propionic anhydride which comprises heating about 74 parts by weight of propionic acid, about 10 parts of nickel carbonyl, and 28 parts of ethylene, under a carbon monoxide pressure of about 600 to 810 atmospheres, at a temperature of about 272° to 293° C., whereby a reaction product containing propionic anhydride is produced.

WILLIAM F. GRESHAM.
RICHARD E. BROOKS.

REFERENCES CITED

The following references are of record in the file of this patent:

UNITED STATES PATENTS

| Number | Name | Date |
| --- | --- | --- |
| 1,884,626 | Dreyfus | Oct. 25, 1932 |
| 1,884,627 | Dreyfus | Oct. 25, 1932 |
| 1,973,662 | Schalch | Sept. 11, 1934 |
| 2,007,642 | deSimo | July 9, 1935 |
| 2,015,065 | Carpenter | Sept. 24, 1935 |
| 2,079,216 | Larson | May 4, 1937 |
| 2,089,903 | Larson | Aug. 10, 1937 |

FOREIGN PATENTS

| Number | Country | Date |
| --- | --- | --- |
| 316,898 | Great Britain | of 1928 |

OTHER REFERENCES

"Advances in Acetylene Chemistry as Developed by Walter Reppe" Intelligence Division Report No. 4,149, dated 24 March 1945, p. 26.

Peck et al., Fiat Final Report No. 273, "Interview with Dr. W. J. Reppe" dated 2 October 1945, p. 10.